(12) United States Patent
Crosbie et al.

(10) Patent No.: US 8,914,012 B2
(45) Date of Patent: Dec. 16, 2014

(54) SYSTEM AND METHOD FOR MONITORING APPS IN A VEHICLE TO REDUCE DRIVER DISTRACTION

(71) Applicant: Excelfore Corporation, Fremont, CA (US)

(72) Inventors: John Edward Crosbie, Fremont, CA (US); Anoop Balakrishnan, Fremont, CA (US); Shrikant Acharya, Fremont, CA (US); Shrinath Acharya, Fremont, CA (US)

(73) Assignee: Excelfore Corporation, Fremont, CA (US)

( * ) Notice: Subject to any disclaimer, the term of this patent is extended or adjusted under 35 U.S.C. 154(b) by 118 days.

(21) Appl. No.: 13/790,985

(22) Filed: Mar. 8, 2013

(65) Prior Publication Data

US 2014/0106726 A1 Apr. 17, 2014

Related U.S. Application Data

(60) Provisional application No. 61/714,442, filed on Oct. 16, 2012.

(51) Int. Cl.
| | |
|---|---|
| *H04M 3/00* | (2006.01) |
| *H04W 4/00* | (2009.01) |
| *G06F 17/00* | (2006.01) |
| *B60W 50/14* | (2012.01) |
| *B60K 35/00* | (2006.01) |
| *B60K 37/06* | (2006.01) |
| *H04W 4/04* | (2009.01) |
| *G06F 1/16* | (2006.01) |
| *H04M 1/725* | (2006.01) |
| *H04M 1/60* | (2006.01) |

(52) U.S. Cl.
CPC ............... *H04W 4/001* (2013.01); *G06F 17/00* (2013.01); *B60W 50/14* (2013.01); *B60K 35/00* (2013.01); *B60K 37/06* (2013.01); *H04W 4/046* (2013.01); *G06F 1/1632* (2013.01); *B60K 2350/1004* (2013.01); *B60K 2350/1024* (2013.01); *B60K 2350/1032* (2013.01); *B60K 2350/106* (2013.01); *B60K 2350/1096* (2013.01); *B60K 2350/352* (2013.01); *B60K 2350/901* (2013.01); *B60K 2350/903* (2013.01); *B60K 2350/906* (2013.01); *B60K 2350/967* (2013.01); *B60K 2350/962* (2013.01); *H04M 1/72577* (2013.01); *G06F 2200/1635* (2013.01); *H04M 1/6091* (2013.01); *H04M 2250/02* (2013.01)
USPC ............ 455/418; 455/414.2; 340/425.2; 340/902

(58) Field of Classification Search
USPC ............ 455/418, 414.2; 340/425.5, 902
See application file for complete search history.

(56) References Cited

U.S. PATENT DOCUMENTS

| | | | |
|---|---|---|---|
| 2001/0020893 A1* | 9/2001 | Kawai et al. | 340/425.5 |
| 2007/0159354 A1* | 7/2007 | Rosenberg | 340/902 |
| 2012/0040652 A1* | 2/2012 | Lewis | 455/414.2 |
| 2013/0332063 A1* | 12/2013 | Pirwani et al. | 701/409 |

* cited by examiner

*Primary Examiner* — David Q Nguyen

(74) *Attorney, Agent, or Firm* — Brinks Gilson & Lione

(57) ABSTRACT

A system and method for monitoring apps in a vehicle to reduce driver distraction is disclosed. A controller operating inside or in combination with the head unit of the vehicle may monitor operation of the vehicle, and generate alerts indicative of operation of the vehicle (such as an alert indicative that the vehicle is operating at a predetermined speed). In response to the alert, the operation of the app in the vehicle may be modified.

22 Claims, 14 Drawing Sheets

Head Unit with Embedded Apps

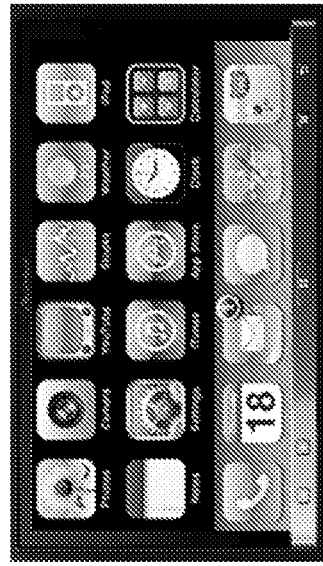
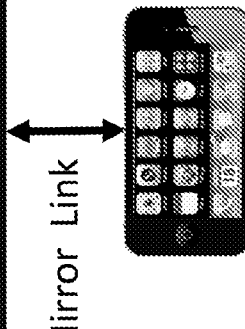
FIG. 2B
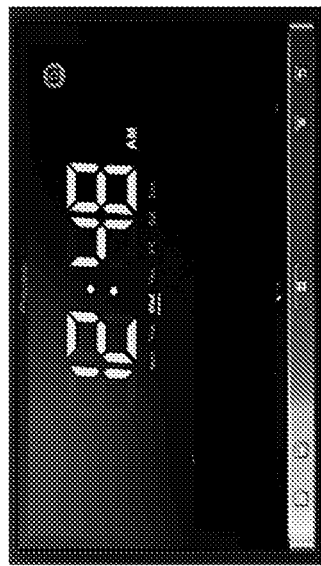
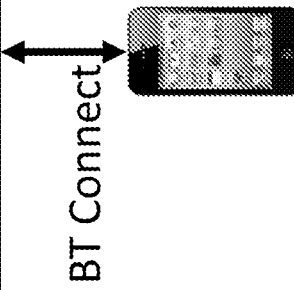
FIG 2A

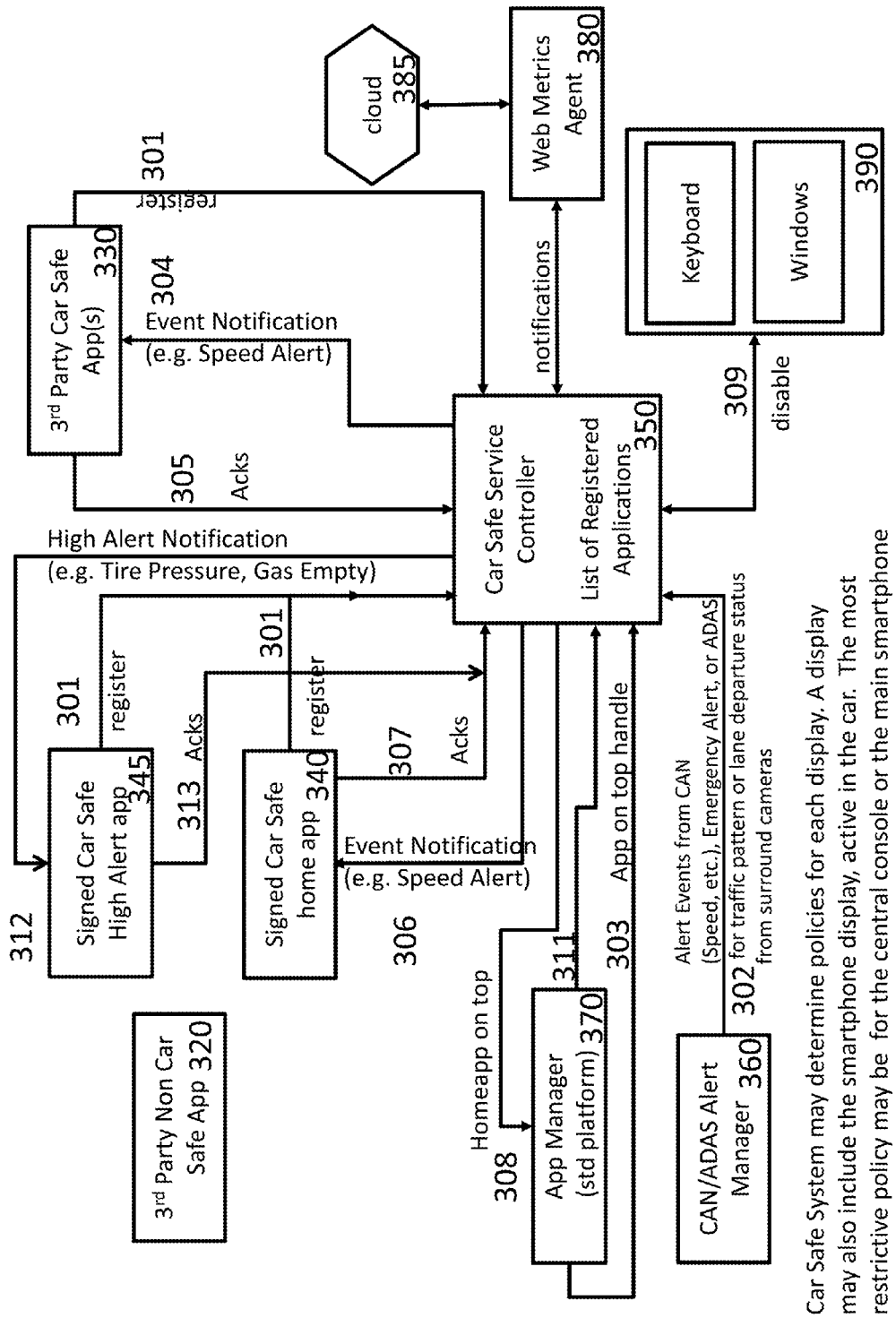

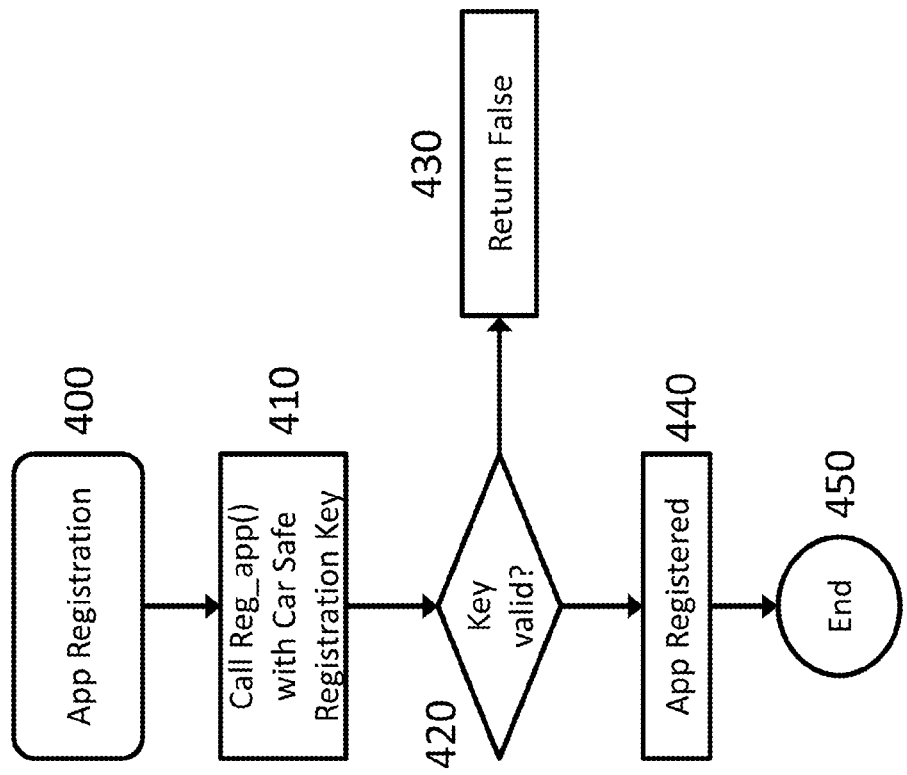

Note:
Developer may create own key pair. The Platform may generate a public key specific to Developer. Developer may encrypt with Platform public and its own private key pair. Developer may sends encrypted Application along with the Public Key to Platform. Platform may then use the Developer public key and Platform private key to decrypt the submitted package.

SYSTEM AND METHOD FOR MONITORING APPS IN A VEHICLE TO REDUCE DRIVER DISTRACTION

REFERENCE TO RELATED APPLICATION

This application claims the benefit of U.S. Provisional Application No. 61/714,442, filed on Oct. 16, 2012, the entirety of which is incorporated by reference herein.

TECHNICAL FIELD

This application relates generally to application software, commonly referred to as an app. More specifically, this application relates to installing and operating of apps in a moving vehicle, such as an automobile.

BACKGROUND

Apps are computer software designed to help the user to perform specific tasks. Apps may be executed on a variety of computing devices, such as on mobile devices including smartphones. For example, mobile apps are software applications designed to run on smartphones, tablet computers and other mobile devices. The apps are available through application distribution platforms, which are typically operated by the owner of the mobile operating system, such as the Apple App Store, Google Play, Windows Phone Store and Black-Berry App World. The mobile devices, such as the smartphones and tablet computers, are designed to readily accept the apps for installation and operation.

Vehicles have computing devices that interface with the driver and passengers. One type of vehicle computing device is the head unit, one example of which is a connected infotainment unit. The head unit is typically the control center and user interface for an automobile's entertainment and information center, which typically resides in the center of the dashboard and has a wireless connection to the web e.g., a Cloud Server. The head unit may provide the main controls for the radios (any combination of AM, FM, XM, Sirius, HD Radio) as well as a CD/DVD player, GPS navigation, Bluetooth cellphone integration, hard disk storage for music and iPod® connector and system status. With a Wireless connection the head unit provides status information back to the Cloud and a control to the Cloud to allow apps to be downloaded into head unit.

Today, car manufacturers have released a handful of applications for their individual platforms, such as BMW 5, Toyota Entune 8, Ford Sync 6. Car companies are reluctant to allow for apps to be freely downloaded into a vehicle. So, by design, the car manufacturers make it exceedingly difficult to load generic apps into the vehicle.

BRIEF SUMMARY

Method and systems are disclosed for operating apps in a head unit of a vehicle. or in a smartphone in communication with the head unit of the vehicle.

In one aspect, a controller of a head unit is disclosed. The controller is configured to receive information regarding a current operation or a current environment of the vehicle; and determine whether or how to control operation of an app based on the current operation or the current environment of the vehicle, wherein the app comprises a software application downloaded from a server to the head unit. In one example, the controller is configured to receive information generated either internal to the vehicle (such as relating to the current status of the vehicle) and/or information external to the vehicle (such as relating to road conditions, weather conditions, traffic conditions, or the like). Depending on the information received, the controller may determine whether to modify operation of the app and/or how to modify operation of the app (such as modifying the ability to make changes to the app or provide inputs to the app). In another example, the controller is further configured to execute the app, and is configured to determine whether or how to control operation of the app by determining a type of app. Examples of types of apps include, but are not limited to, whether the app is controllable by the controller in order to reduce distraction to a driver of the vehicle; whether the app is an audio app; whether the app is a video app; whether the app is displaying info such as insurance quotes, parking or weather etc. The controller may receive information from a variety of sources, such as sensors on the vehicle and/or sensors external to the vehicle. Examples of sensors include, but are not limited to, speed sensors, camera sensors (e.g., ADAS), or the like. The information may further be one of several types, such as car operation alerts, weather alerts, road alerts, emergency alerts, or the like. The alerts may be generated internal to the vehicle or external to the vehicle. The information may be communicated using a multitude of communication methods, such as wired or wireless communication (such as a cellular communication, Wi-Fi, Bluetooth, etc.). For example, the information may be generated in the vehicle and communicated via the CAN bus. As another example, the information may be communicated wirelessly, such as via the 802.11p standard. As still another example, the vehicle may receive the alerts via the web (such as through a cloud web). The controller may use the information in order to determine the current state of the vehicle and/or the current environment of the vehicle (e.g., speed of vehicle, catastrophic event, traffic info from the surround cameras, lane departure warnings etc.). The controller may control the operation of the app based on one or more factors, such as based on any combination of the following: the current state of the vehicle; the current environment of the vehicle; the type of app (e.g., whether the app is "car safe" or can be modified to reduce distraction to the driver); the input device used to input data to the app (e.g., whether the input device requires a text input via a keyboard or touchpad or whether the input device is voice-activated); and/or the output device used to output data from the app (e.g., a display configured either for output to the driver or to a backseat passenger). For example, if the app is found not to be "car safe", the operation of the app may be frozen (so that input is not accepted or output is not generated) or may be ended (so that execution of the app is stopped). As another example, if the app is found to be "car safe", the operation of the app may be modified. As still another example, if the controller determines that the app receives input from an input device (such as an input device associated with the driver or associated with a backseat passenger), in response to a determination of a state of the vehicle, the controller may determine whether to change operation of the app to modify the ability to input via the input device (e.g., if the input device is associated with the driver, disallow input via the input device, or if the input device is associated with a backseat passenger, maintain the ability to input via the input device). As yet another example, if the controller determines that the app generates output for an output device (such as an output device associated with the driver or associated with a backseat passenger), in response to a determination of a state of the vehicle, the controller may determine whether to change operation of the app to modify the ability to output to the output device (e.g., if the output device is associated with the driver, disallow output to the output device, or if the output device is associated with a backseat passenger, maintain the ability to output to the output device). As still another example, if the controller determines an alert as to the operation of the vehicle (e.g., a CAN alert indicative of the anti-lock breaking system activating) and/or to the environment of the vehicle (such as a determination as to inclement weather (e.g., foggy, snowy or rainy conditions), excessive traffic, other road alerts or emergency alerts), the controller may modify operation of the app. More specifically, the Apps and/or the controller may be linked to services, such as Road Alerts, Weather alerts specific to a journey the driver is taking or other emergency services, which can send alerts through the web into the app. In response to receipt of the alert, the controller may change operation of the app and/or may change the metrics for controlling operation of the app. In one embodiment, in response to receiving an emergency alert (either indicative of an emergency alert related to operation of the vehicle or related to the environment of the vehicle), the controller may disable operation of part or all of the app. Alternatively (or in addition), the controller may change the metrics of controlling the app. For example, the amount of freedom that the driver (or other passenger) has to make changes or provide inputs to the app. As another example, in response to receiving an emergency alert, the controller may change the speed at which such limitations are enforced (e.g., in ordinary conditions, functions of the app may be enable or disabled at 10, 20, 30 MPH (below 10 MPH, all operations allowed, 10-20 MPH, certain inputs allowed, 20-30 MPH, voice input allowed, and over 30 MPH, no input allowed), can be changed to 5, 15 and 25 MPH, respectively.

In another aspect, a controller of a head unit in a vehicle is disclosed, the head unit being in communication with a portable electronic device (such as a smartphone). The controller is configured to: receive information regarding a current operation or a current environment of the vehicle; generate an alert, the alert indicative of the current operation or the current environment of the vehicle; and send the alert to the portable electronic device, the alert used by the portable electronic device to determine whether or how to control operation of an app executed by the portable electronic device, wherein the app comprises a software application downloaded from a server to the portable electronic device. The controller may control the operation of the app being executed on a smartphone in communication with the head unit based on one or more factors, such as based on any combination of the following: the current state of the vehicle; the type of app (e.g., whether the app being executed on the smartphone is "car safe" or can be modified to reduce distraction to the driver); the input device used to input data to the app (e.g., whether the input device requires a text input via a keyboard or touchpad or whether the input device is voice-activated); and/or the output device used to output data from the app (e.g., a display on the smartphone is configured either for output to the driver or to a backseat passenger).

In yet another aspect, an app configured for execution on a smartphone is disclosed. The app is configured to: request, via a transceiver on the smartphone, communication with a head unit of a vehicle; receive, via the transceiver, an alert, the alert indicative of the current operation or a current environment of the vehicle; and analyze the alert to determine whether or how to control operation of the app, wherein the app comprises a software application downloaded from a server to the portable electronic device.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

FIGS. 2A-B are car-safe configurations with smartphones.
FIG. 3 is a block diagram of the car-safe system components at run time.
FIG. 4 is a flow diagram of registration of a car-safe app.

DETAILED DESCRIPTION

Figure 1B:
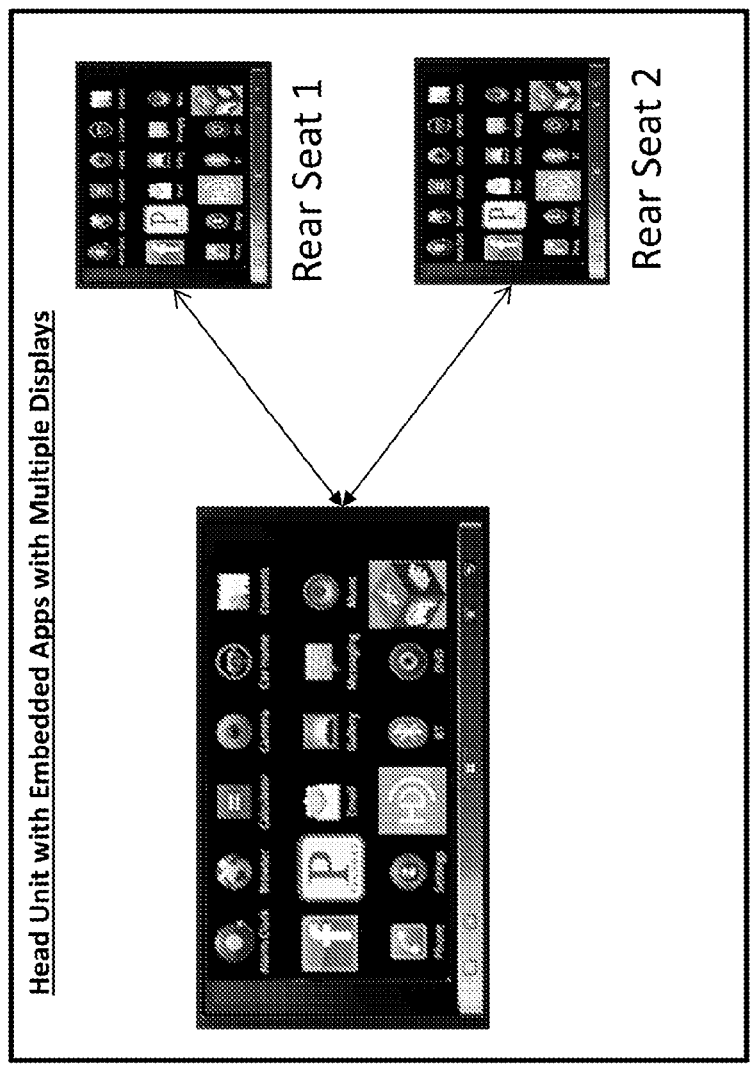
FIGS. 1A-C are car-safe configurations with head units.
Figure 1A:
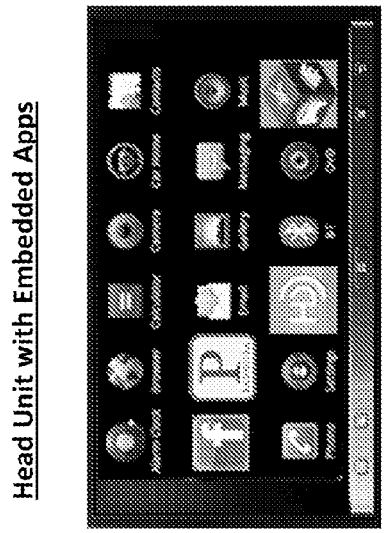
Figure 1C:
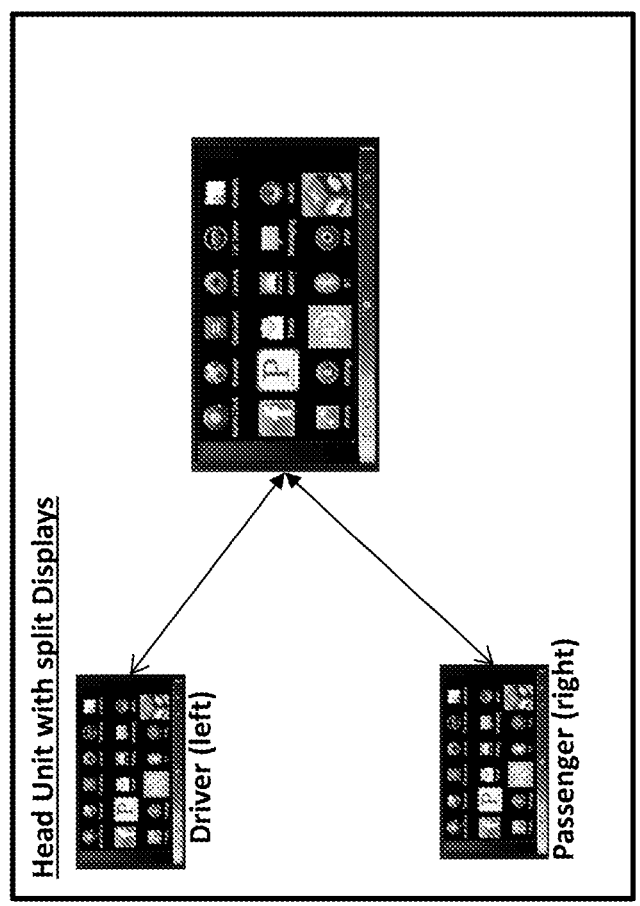

Apps may be executed in a vehicle in one of several ways. In one embodiment, the app may be stored in and be executed by the head unit. One example of this is illustrated in FIG. 1A in which one or more apps are embedded in the head unit of a vehicle. The vehicle may be used for transporting people or goods, and may be any one of the following: an automobile, a motorcycle, a truck, a cart, or the like. Another example of this is illustrated in FIG. 1B in which one or more apps are embedded in the head unit, and in which one or more electronic devices communicate with the head unit. The one or more electronic devices may be mounted for display in a rear seat of the vehicle (such as in the back side of a headrest). Another example is illustrated in FIG. 1c in which one or more apps are embedded in the head unit, and in which the main display screen is split into two, one for the driver and the other for the front seat passenger. The driver is not privy to the front passenger display screen and vice-versa. Therefore, the front seat passenger display acts as if there is another device connected to the head unit. In operation, the one or more electronic devices may communicate with the head unit, request execution of the app, and receive a stream of data from the head unit when executing the app.

In another embodiment, the app may be stored in and be executed by a device other than the head unit. One example of this is illustrated in FIG. 2A in which an electronic device, such as a smartphone, communicates with a head unit. More specifically, FIG. 2A illustrates a display-less head unit with connection to a smartphone where the smartphone may become the "car safe" applicable device. The smartphone may include an Android interface, or other type of interface, e.g. HTML5 which may have the same application packaged download capabilities such as the Android. The smartphone stores the one or more apps therein, and executes the apps. Further, the smartphone communicates with the head unit, such as via a Bluetooth or other near-field wireless communication protocol. As shown in FIG. 2A, the display of the head unit does not mirror the display of the smartphone. Rather, the head unit provides information (such as alerts as to the operation of the vehicle) to the smartphone, as discussed in more detail below. Another example of this is illustrated in FIG. 2B in which an electronic device, such as the smartphone, communicates with a head unit. More specifically, the head unit may operate in Mirror Mode, wherein the Smartphone Screen is projected onto the head unit Display. In such a situation, the car safe apps are installed in the smartphone so that the smartphone stores the one or more apps therein, and executes the apps. Further, the smartphone communicates with the head unit, such as via near-field wireless communication protocol (NFC). As shown in FIG. 2B, the smartphone provides information for display on the display of the head unit (e.g., so that the display of the head unit mirrors the display of the smartphone).

In FIGS. 2A and/or 2B, in one embodiment, the head unit provides information (such as alerts as to the operation of the vehicle) to the smartphone, and the smartphone makes the determination whether and/or how to modify operation of the app, as discussed in more detail below. In this embodiment, the smartphone is provided the information as to the operation of the vehicle (such as in the form of an alert), and makes the determination whether and/or how to modify operation of the app. In an alternative embodiment, the head unit determines whether and/or how to modify operation of the app, and sends a command to the smartphone. In response to receiving the command, the smartphone executes the command in order to implement whether and/or how to modify operation of the app. In this embodiment, the head unit makes the determination whether and/or how to modify operation of the app. Further, in this embodiment, the head unit may make a threshold determination as to the type of app that is being executed on the smartphone. If the type of app is one that can be controlled by the head unit (and more specifically, is deemed "car safe", as discussed below), the head unit is configured to send information to the smartphone (such as the head unit sending information as to the operation of the vehicle for the smartphone to process as illustrated in FIG. 2A or such as the head unit sending information in a mirror link as illustrated in FIG. 2B)

In managing the operation of an app, one or more determinations may be made including: (1) determination of the state of the vehicle (including the determination of the current operation and/or the current environment of the vehicle); (2) in response to the determination of the state of the vehicle, determining whether (and how) to modify operation of the app; and/or (3) dependent of the varying stages of the state of the vehicle, change the level of modification of the app.

In one embodiment, the one or more determinations may be performed by the head unit (such as the same elements within the head unit or different devices within the head unit). For example, the head unit may determine the state of the vehicle. Further, based on the state of the vehicle, the head unit may determine whether (and how) to control the operation of the app. For example, depending on the type of alert and/or the type of app (e.g., whether the app is designated as "car-safe", as discussed below) and/or which display the app is outputting to (e.g., whether the app outputs to a display on the main console, which is visible to the driver, or whether the app outputs to a display in the rear seat, which is not visible to the driver), the head unit may determine whether to control the operation of the app. As one example, the head unit may determine that the app is outputting to the rear seat, in which case, the head unit will determine not to modify the operation of the app. As another example, the head unit may determine that the app is outputting to the main console (visible to the driver), in which case, the head unit may determine to modify the operation of the app. Further, in response to determining to control the operation of the app, the head unit may determine how to control the operation of the app based on the type of alert and/or the type of app (e.g., the control of the app may be dependent on whether the app is designated as "car-safe" or not, as discussed below). In one embodiment, the head unit driver side display may show a different screen than the front passenger display. In such cases, only the driver side screen may be constrained per the "car Safe" policies in force.

In an alternate embodiment, the determination as to the state of the vehicle may be performed by the head unit, whereas the determination whether (and how) to control the operation of the app may be performed by an electronic device other than the head unit (such as a smartphone that is communication with the head unit, as illustrated in FIGS. 2A-B). For example, the smartphone (or other electronic device) may receive a communication from the head unit, with the communication indicating the current state of the vehicle. In response to the communication, the smartphone may determine whether (and how) to control the operation of the app. So that, the "car safe" software for determining whether (and how) to control operation of the app may be resident on the smartphone. For example, depending on any combination of the following factors including: the type of alert (road alert, weather alert, emergency alert, car emergency alert, etc.); the type of app (e.g., whether the app is designated as "car-safe", as discussed below); and/or which display the app is outputting to (e.g., whether the smartphone is docked in a position visible by the driver, or whether the smartphone is docked in the rear seat of the vehicle), the smartphone may determine whether to control the operation of the app. Further, in response to determining to control the operation of the app, the smartphone (or other electronic device) may determine how to control the operation of the app based on the type of alert and/or the type of app (e.g., the control of the app may be dependent on whether the app is designated as "car-safe" or not, as discussed below).

The functionality of the smartphone determining whether (and how) to modify operation of the app may be dependent on the mode of the smartphone. For example, the smartphone may recognize one of two modes: (1) a head unit communication mode in which the smartphone is communicating with the head unit; and (2) a normal communication mode in which the smartphone is not communicating with the head unit. When the smartphone determines that the smartphone is communicating with the head unit (e.g., via the BT connection illustrated in FIG. 2A), the smartphone may determine that it is in the first mode. In the first mode, when the smartphone receives the communication from the head unit, the smartphone may determine whether (and how) to modify operation of the app running on the smartphone. In the second mode (whereby the smartphone is not communicating with the head unit) when no connection exist, the smartphone will run under no supervision or controls and operations of the app are not restricted.

In yet another embodiment, the head unit may send information as to the state of the vehicle (such as the current operation of the vehicle and/or the current environment of the vehicle) to an electronic device other than the head unit (such as a smartphone), and the determination as to the state of the vehicle and the determination whether (and how) to control the operation of the app may be performed by the electronic device other than the head unit (such as the smartphone that is communication with the head unit, as illustrated in FIGS.

2A-B). For example, the smartphone (or other electronic device) may receive a communication from the head unit, with the communication indicating information that the smartphone may use to determine the current state of the vehicle. In response, the smartphone may determine the state of the vehicle, and accordingly determine whether and/or how to control the app.

The state of the vehicle may comprise any one of multiple states. As discussed in more detail below, the head unit may determine the state of the vehicle and/or the smartphone may determine the state of the vehicle. For example, the head unit may receive one or more data inputs from the current operation (e.g., current speed, etc.) or the current environment of the vehicle (e.g., traffic congestion, road conditions, weather conditions, etc.) in order to determine the state of the vehicle. In one embodiment, the head unit receives the one or more data inputs via a controller area network (CAN) bus, Advanced Driver Assistance System (ADAS), 802.11p wireless interface, etc. Alternatively or in addition, the head unit receives the alert via a communication from the Internet (such as receiving weather, traffic, or emergency conditions via the Internet). The CAN bus is one example of a vehicle bus designed to communicate data regarding the operation of the vehicle. Examples of data received via the CAN bus include, but are not limited to: velocity of the vehicle; operation of the cruise control; operation of the electronic brake system (including whether the brakes are operating and how the brakes are operating (e.g., whether the anti-lock braking system is activated); operation of the electronic circuitry (e.g., the operation of the steering mechanism, the operation of the accelerator pedal, the operation of the headlights (including whether the headlights are on and whether the headlights are on high-beam); the operation of the sunroof, the operation of the door control unit; the operation of the power windows); operation of the airbag system; etc. Examples of ADAS related input include, but are not limited to: lane departure warnings, traffic congestion warning through surround cameras, rear camera, etc. In response to receiving the data, the head unit may determine the state of the vehicle.

Further, as discussed above, the determination whether (and how) to modify operation of the app may be dependent on the type of app that is being executed. As one example, the app may be designated as "car-safe". Designation of an app as "car-safe" indicates that the app is configured to be controlled by the head unit or by the smartphone in order to reduce distraction to the driver when the vehicle is in a particular state (such as when the vehicle is travelling above a predetermined speed, such as 10 mph). More specifically, a "car-safe" app may include one or both of the following: (1) the ability of an external device, such as the head unit or a smartphone, to monitor the functions being performed by the app; and (2) the ability of the external device, such as the head unit or a smartphone, to modify the functions being performed by the app. For example, the app, when executed, may provide navigation functionality. In a first predetermined state of the vehicle (such as the vehicle traveling more than 10 mph), the app may be limited to a first predetermined functionality (such as input of a destination only via voice-input). In a second state of the vehicle (such as the vehicle traveling more than 50 mph), the app may be limited to a second predetermined functionality (such as removal of any ability to input the destination into the navigation app). As another example, the app, when executed, may provide streaming audio functionality (such as Internet radio). In a first predetermined state of the vehicle (such as the vehicle traveling more than 10 mph), the app may be limited to predetermined functionality (such as a display with icons indicating "buttons" for presets of radio stations akin to a normal radio). In a second predetermined state of the vehicle (such as the vehicle traveling more than 50 mph), the app may be limited to a second predetermined functionality (such as removing any ability to change the operation of the Internet radio). In this way, "car safe" software may be used to control the "car safe" app in order for the control of the "car-safe" app to be adaptive depending on the determined state of the vehicle.

As another example, the controller may determine whether or how to control the vehicle based on the type of alert. More specifically, the controller may receive information as to a weather alert, traffic alert, emergency alert (e.g., an accident reported or road conditions), and in response thereto, change the metrics for controlling the app. Examples of metrics that may be change include, but are not limited to: modify operation of the app (e.g., cease operation of the app, cease the ability of the driver to input data into the app, etc.); modify the criteria in which to control the app (e.g., in response to a weather alert, reduce the pre-determined speeds from 10 MPH to 5 MPH that trigger the controller to cease the ability of the driver to input data into the app so that the driver cannot input data to the app at a lower speed of the vehicle).

In order to support "car-safe" apps, different aspects in the life of the "car-safe" app are discussed below, including testing, validating, packaging, downloading, and operating the "car-safe" app.

In another aspect, the apps in the vehicle may be monitored. The apps and their environment within the vehicle may be monitored and policed via the Internet. The monitoring and policing may be performed to create a safe environment for vehicles. The ability to monitor usage behavior, such as the number of clicks, the number of concurrent applications being invoked and other similar metrics, may allow for dynamic adjustment of the restrictions for specific applications that are invoked by consumers. More specifically, the determination of whether (or how) to control the operation of apps may be based on one or more parameters. The one or more parameters may be updated. The updated parameters may be based on the monitored usage behavior. For example, an external device may analyze the usage behavior, and generate one or more updated parameters to send to the head unit. The head unit, in turn, may use the one or more updated parameters in order to determine whether (or how) to modify operation of apps in a dynamic manner.

Safety is one factor when executing apps in a vehicle. The apps should not unduly distract the driver from operation of the vehicle while maintaining the apps' utility. More specifically, the vehicle is a means of transportation and not a platform to play apps. In order to safely execute apps in the vehicle, the various stages of the life cycle of the app are discussed below including: the design of the apps; the operation of the apps; and the policing of the apps. In this way, a "car safe" Eco System may be generated for vehicles, such as vehicles that have a head unit and potentially one or more Bluetooth connected Smartphones.

The following are factors resulting in the advancement of using apps in vehicles: (1) platforms incorporating multicore SOIC processors with HW virtualization; (2) incorporation of multi OS environments with firewall inside head units (e.g., a separate OS (e.g., Linux) that Car OEMs control for critical car functions; or a separate OS dedicated to consumers apps (e.g., Android, HTML5)); (3) Web Delivery, Administration, Monitoring of Apps and Quality of Service; (4) ability to refresh the consumer OS on the same timelines as the Phone OS so that the smartphone and Car head unit consumer OS are on the similar trajectory.

In one embodiment, a set of system APIs and processes are presented that allow individual app developers the ability to test, validate and package their application for integration into the vehicle head units. Thereafter, the operation of the apps may be predetermined and well-behaved so as not to distract the driver of the vehicle. The integrated apps may be deemed "car cafe". This means that the applications will reduce the potential to distract the driver or reduce driver interaction with the app while the vehicle is in a predetermined state (e.g., when the vehicle is in motion). For example, a threshold event is triggered at a predetermined vehicle velocity, and in response to the trigger, the system is configured to initiate actions (such as preventative actions) that increase safety of the vehicle. By implementing the "car safe" functionality, apps may be executed more safely in the vehicle, thereby reducing fears by vehicle manufacturers of the proliferation of execution of apps in vehicles while in motion.

In multi-display systems, such as a main head unit (center console) and multiple displays (such as rear-seat displays and/or front passenger display), the rules associated with control of the apps may be dependent on which display is the output of the app is sent. More specifically, the rules may be different depending on which display in the vehicle is the output of the app rendered. For example, since the rear seat displays typically will not be distracting to the driver, the output of the app to the rear seat display may not be restricted. Similarly, only the phone(s) that are connected to the head unit may be subject to restrictions and not the other phones in the car. More specifically, when it is determined that the smartphone is in a mode of communicating with the head unit, the smartphone may be subject to restrictions on the output of apps to the display.

One stage in the life cycle of an app is application registration. In particular, the app may be registered as "car safe". Applications that have been validated in the car environment and are tested for proper behavior in the car may be signed as "car safe".

"Car safe" signed applications may have special privileges in how they present and interact with the driver while the car is in motion. Unregistered Apps may still work in this environment but may have more restrictions in their actions when the car is in motion, as discussed in more detail below. "Car safe" restrictions may be applicable to the main head unit as well the primary phone that is connected to head unit's BT communication system.

When the apps are executed while the vehicle is in operation (e.g., when the vehicle is in motion), the behavior of the app may be modified in one of several ways. For example, apps that are not signed as "car safe" may either be terminated or pushed in the background and a home app screen may be brought into the foreground. If apps are "car safe" registered, then the system may restrict the apps operations but may still allow them to operate according to predetermined operations. As merely a few examples (though not exhaustive), the "car safe" registered app may play according the following use cases:

(1) if the "car safe" registered app is a motion video application, then the head unit (such as the car safe service controller 650, discussed below) may bring the home app screen to the foreground (or may command the display to output the home app screen), thereby hiding the video output of the app while allowing the audio to play (unsigned apps may simply be paused);

(2) if the "car safe" signed app is an internet radio application (e.g., Pandora, Stitcher, etc.), then the audio may play in the background. In addition, the controller may modify the operation of the app to limit input to the app. For example, the driver operator may be disallowed from using a first type of input (such as a text or numerical input for an Internet radio station) but may be allowed a second type of input (such as skipping streams or pre-sets already in memory). Unsigned apps may move into the background with audio on.

(3) if the "car safe" signed app requests text entry (e.g., a navigation app which requests an address input or an info app such a road condition alert application), then such applications may be put in background and/or may disable text entry but allow speech-to-text facility so as to allow input to continue while the car is in motion. Unsigned apps may simply move to the background, thereby disabling all text entry.

One or more states of the vehicle may trigger a modification of operation of the app. For example, the CAN bus indicates the speed of the vehicle or ADAS indicates a lane departure or traffic congestion warning. The CAN/ADAS Alert Manager 660, discussed below, may determine whether a speed threshold has been met (e.g., 10 mph) or another ADAS warning has been triggered. In response to determining the speed threshold or ADAS trigger has been met, the CAN/ADAS Alert Manager 360 may issue an alert that acts as a trigger to disable the keyboard and request all active applications to report their usage of the Windows. As another example, information from the CAN bus may indicate an airbag deployment, tire deflation issue, or other type of catastrophic alert. In response to receiving the catastrophic alert, the "car safe" software may modify operation of the apps, such as controlling the display of the head unit in order to indicate the problem.

Further, as discussed above, the vehicle may have various configurations of the electronics, such as illustrated in FIGS. 1A-C and FIGS. 2A-B. The car safe management system may apply to the primary display (such as the display on the head unit) and/or to the displays on smartphone(s) active through the BT system. For example, cars of today have unitary or multiple configurations (e.g., vehicles with rear seat entertainment systems). The car safe management system may distinguish where the apps are working in the vehicle and create different policies for displays based on their physical location within the vehicle. Similarly, phones that are connected to the BT System may have their ability to invoke apps restricted while the car is in motion. This may be triggered by the same motion event that apps executed on the head unit are subjected.

The system may further be used to generate data for web metrics. The metrics may measure any one of multiple aspects such as: how many applications are running in foreground when triggers are activated; how many applications are disabled, which may be the same that are active and how many are in the background; how many times a particular app is executed in a predetermined period (e.g., 24 hrs/week/month etc.); how many are registered applications, how many are non-registered or not safe. The Internet may adjust the rating of the application over time if it is deemed to be useful. Further, the "car safe" registrations and policies may be updated over the Internet into one or more devices in the vehicle, such as the head unit.

One stage of life of the app is operation. FIG. 3 is a block diagram of the dynamic operation of car-safe system components (e.g., operation at run time). More specifically, FIG. 3 describes the operation of the Car Safe System when Applications are running and the vehicle is being driven. The operation may be viewed as a series of transition of states related to various blocks comprising the Car Safe system. State 301 is the beginning wherein every $3^{rd}$ Party Car Safe app and even the Car Safe home app initiate a registration process with the Car Safe Service Controller 350. Non Car Safe applications (e.g., 320) may not be visible to the Car Safe Service Controller 350 except the Application Manager 370. State 302 is the trigger initiated by the CAN Alert Manager 360 (e.g., the vehicle is at or exceeding a predetermined speed). Many parameters may be used to determine the trigger. For simplicity, the trigger illustrated uses speed as an alert to invoke Car Safe Operation of the head unit.

As illustrated in FIG. 3, Car Safe Service Controller 350 may execute car safe software in order to determine whether (and how) to modify operation of the apps based on alerts received from the CAN/ADAS Alert Manager 360. In an alternate embodiment, the functionality of generating the alerts and determining whether (and how) to modify operation of the apps may be performed by one device (such as a single microcontroller or in App Manager 370). Moreover, Car Safe Service Controller 350 may be any type of processor, such as a microprocessor, microcontroller, programmable logic array or other type of arithmetic logic unit that is configured to execute instructions relating to the car safe software.

States 304 and 306 provide notifications for all $3^{rd}$ Party Car Safe Apps including the Car Safe home app. 350 initiates transition 311 requesting Handle of the Top App to the 370 the Application Manager and the handle is returned by state 303. State 302 leads to transitions 303 in which Car Safe Service Controller 350 requests the handle of the top most application to 370. 370 sends back the handle of the "App on top" handle to 350. The Android/HTML5 systems may allow only one application to obtain control of the screen at a time, while it has not stopped the previous application but merely invokes the new application.

CAN/ADAS Notifications go to Car Safe Service Controller 350, which in turns sends out notifications (304, 306) to Car Safe Apps. Similarly, Car Safe Service Controller 350 may send CAN Event notifications to 330, 340. Car Safe Service Controller 350 awaits acknowledgements of the running application which is delivered by transition 303.

Car Safe Service Controller 350 may initiate state transition 309, which may disable one or more hardware devices, such as the keyboard and the windows functions if so desired. Periodically, the Car Safe Service Controller 350 may send metrics about Apps to the Web Metrics Agent 380, which may in turn sends it for Analytics to the cloud 385.

State transition 301 initiates a registration process 400 as described in FIG. 4. 410 makes an API call with the Car Safe Registration number for the application. The registration is verified at 420. If the verification fails 430, the Car Safe Service Controller 350 does not register the app and it acts as if it is yet another non Car Safe App for the duration of the session. If the registration is valid, at 420 the App is registered in 440 and the registered and the process terminates 450. This function, when successful, makes the application Car-Safe Aware. For example, the Car Safe Agent knows about this application as active in the system operating in the vehicle.

Figure 5:
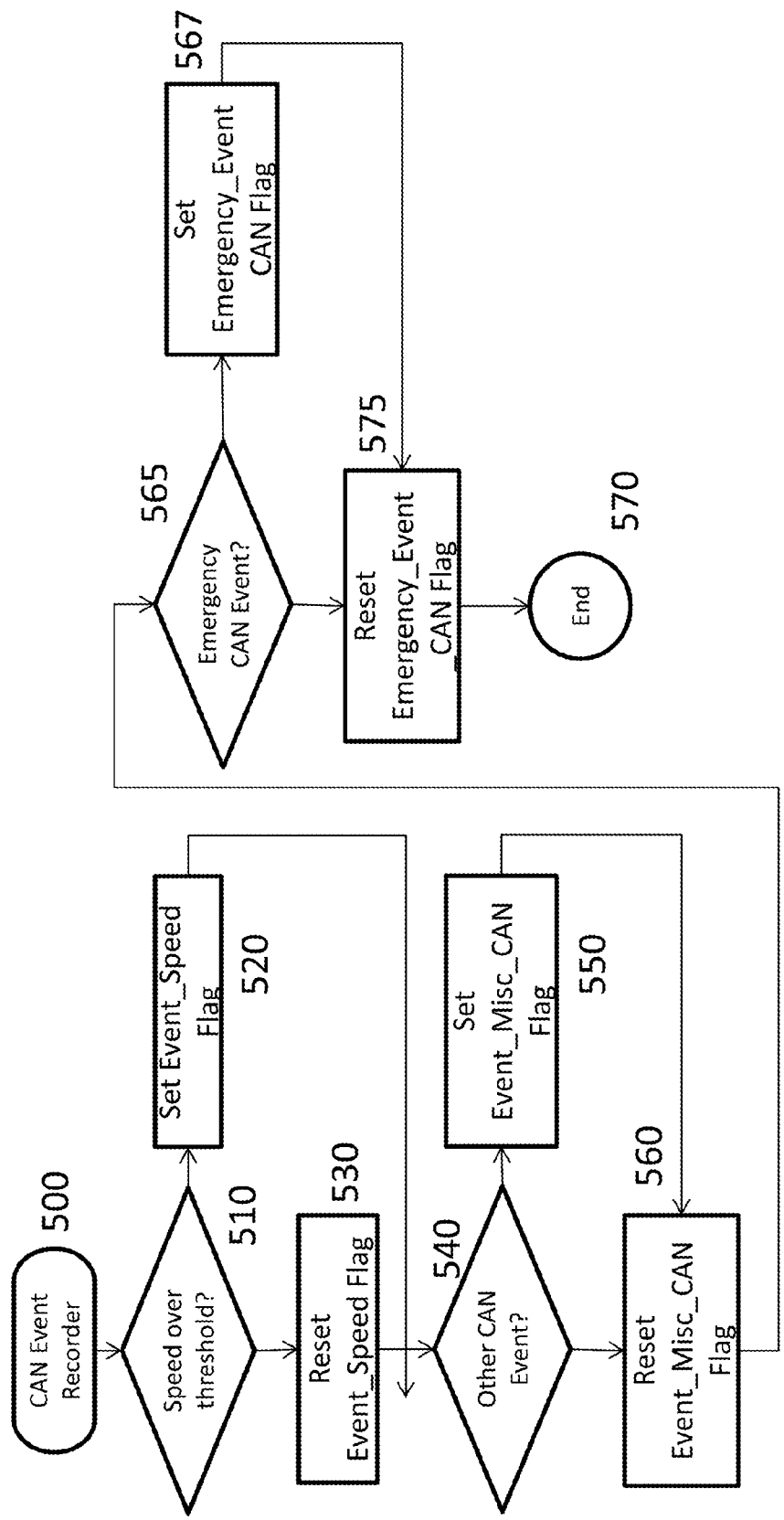
FIG. 5 is a flow diagram of the functionality performed by the CAN alert manager.

As discussed above, one or more alerts may be generated based on information from the vehicle. FIG. 5 describes one example of the functionality for generating alerts using information from the CAN bus. A similar flow chart for FIG. 5 may be created for other types of alerts, such as an ADAS related alert. More specifically, FIG. 5 is a flow diagram of the functionality performed by the CAN/ADAS alert manager 360. State transition 302 initiates the CAN Alert notification 500 to the Car Safe Service Controller 350. At 510, the speed is checked to see if the speed is over the threshold. If the threshold is reached, then the Speed Event flag is set at 520 and the CAN Event Alert is initiated. If the threshold is not reached then the Event flag is reset at 530 and notification is made back to Car Safe Service Controller 350. At 540, other Can events are checked during Misc CAN Alerts that are flagged in the configuration. If a miscellaneous CAN is set, at 550 a notification issues. Otherwise, at 560, the CAN Misc flag is reset. If the configuration does not have any Misc flag set, blocks 540-560 are not executed. Similarly the program checks for Emergency CAN event in 565, e.g. tire burst, fuel empty and sets the High_Alert_CAN flag, otherwise at 575 the High_Alert_CAN flag is reset. If there is no Emergency CAN event then blocks 565-575 are not executed.

Figure 6:
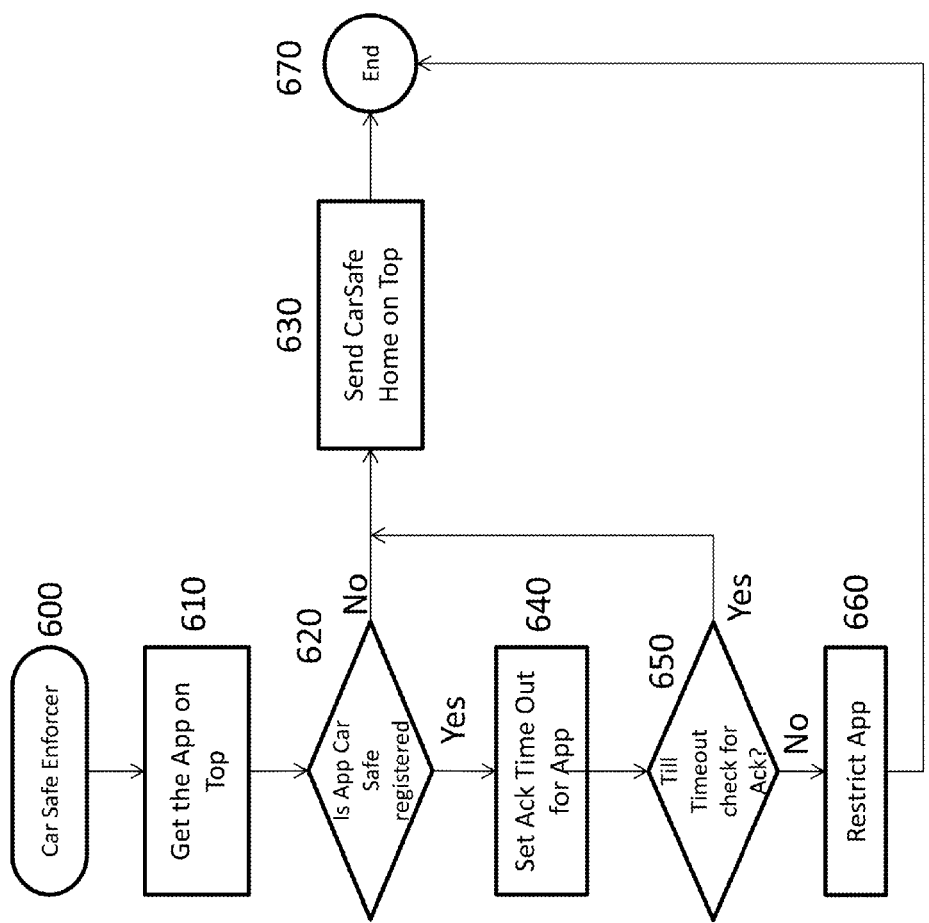
FIG. 6 is a flow diagram of the functionality performed by the car-safe service controller.

As discussed above, one or more factors may be used to determine whether (and how) to modify operation of the apps. The one or more factors include any combination of the following: the type of alert (e.g., speed alert versus catastrophic alert); the type of app (e.g., whether or not the app is designated as "car safe"), the type of device executing the app and/or used to output the app (e.g., whether the app is outputting on a display on the head unit visible to the driver or on a display visible to a passenger; whether the app is being executed by the head unit FIG. 6 is a flow diagram of the functionality performed by the car-safe service controller 350. When the Threshold Alert at 302 is sent to the Car Safe Service Controller 350, the alert triggers the Car Safe System to become active. The Car Safe System functionality, which may be implemented in Car Safe Service Controller 350, examines one or more of the following to determine whether (and how) to modify operation of the app: the type of alert; whether the app is designated as "car safe"; the type of device, etc. For example, the process starts with 600. 610 requests for the App on top and tests whether the App is "car safe" at 620. If the App is not "car safe", then operation of the App is modified, such as setting the Home App on top in 630 (thereby putting the App into the background) and terminating at 670. If the App is "car safe", it may then be determined whether (or how) to modify operation of the App. A timer may be used to determine whether an acknowledgement has been received from the App. Specifically, a time-out clock is set for receiving an Ack receipt from App in 640. At 650, it is determined whether the timeout has expired. If Ack is not received in 650, then the App is deemed as not "car safe" (the App did not send an acknowledgement as to the proper "car safe" operation). The operation of the App is then modified, such as by bringing the home app in 630 and terminate in 670. If Ack is received in 650, proceed to restrict the App in 660 according to the Policy established then terminate 680.

Under special alert from 302 to 350 (e.g., indication of tire pressure loss or burst, lane guidance warning received, traffic congestion sensed based on video from surround cameras indication that the battery is not charging, indication that the fuel gauge is registering empty), the Car Safe System may send an event notification 312 to Signed Car Safe High Alert App 345. This event notification 312 brings the Car Safe High Alert App 345 to the foreground with the appropriate message (such as indicating the type of high alert). Block 345 further sends 313 ack back to 350.

Figure 7:
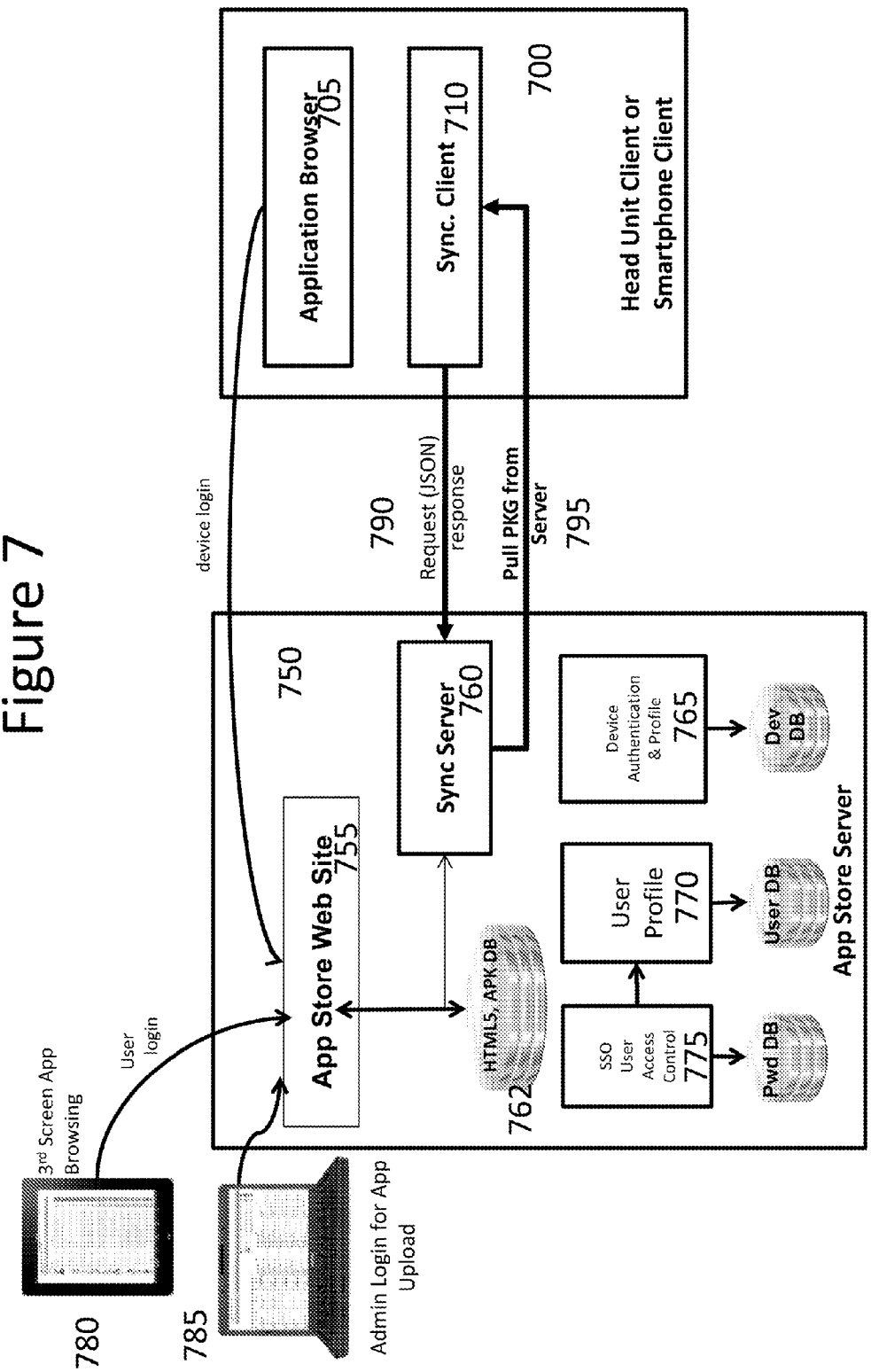
FIG. 7 is a block diagram of the app store architecture.

Another stage in the life cycle of an app is downloading of the app. FIG. 7 is a block diagram of the App Store architecture. FIG. 7 elaborates on the App Store Architecture for Android/HTML5 systems. Android/HTML5 systems are merely discussed as examples of different systems. FIG. 7 illustrates Server 750 and Client 700. The Client 700 may be either a head unit device or a smartphone screen. The Client 700 may install an app using the Application Browser 705 available in the client. The Sync. Client 710 may retrieve any packages that have to installed, deleted or refreshed in the server 750. Sync. Client 710 communicates to its counterpart Sync Server 760 in the Server 750 using JSON request 790 and then pull the packages into head unit with 795.

The Server 750 may be organized as an App Store Web Site 755, Sync Server 760, HTML5 data base 762, SSO (Single Sign On) User Access control 775, User profile 770 and Device Authentication and profile 765. Each of the blocks 775, 770 and 765 may have their respective databases, or may be combined into a single database. Administrative login 785 allows the installation of Apps in the Web Portal, while 780 allows electronic devices, such as iPad®-like devices, to perform the App administration such as Launch, Delete, Refresh of Apps.

The Server 750 is architected so that if request 790 comes as Android JSON requests, then Server 750 shows only the APK packets. Similarly, for HTML5 JSON requests the server 750 shows only OPKg lists.

In one embodiment, the app may be downloaded to the head unit. In this embodiment, prior to accepting the download of the app, the head unit may determine whether the app is designated as "car safe" or may determine whether the head unit may control operation of the app based on different operations of the vehicle. If the head unit determines that the app is "car safe" or can be controlled based on different operations of the vehicle, the app is downloaded into the head unit. If the head unit determines that the app is not "car safe" or cannot be controlled based on different operations of the vehicle, the head unit rejects the download. Alternatively, the head unit may accept download of the app regardless of whether the app is designated as "car safe" or may determine whether the head unit may control operation of the app based on different operations of the vehicle. Instead, upon requesting execution of the app by the head unit, the head unit may determine whether the app is designated as "car safe" or may determine whether the head unit may control operation of the app based on different operations of the vehicle. If the head unit determines that the app is "car safe" or can be controlled based on different operations of the vehicle, the app is executed by the head unit. If the head unit determines that the app is not "car safe" or cannot be controlled based on different operations of the vehicle, the head unit rejects execution of the app.

In an alternate embodiment, the app may be downloaded to a smartphone, which communicates with the head unit, such as illustrated in FIGS. 2A-B. In this embodiment, upon the app (which is executing on the smartphone) requesting access to the head unit (such as receiving data from or sending data to the head unit), the head unit may determine whether the app is designated as "car safe" or may determine whether the head unit may control operation of the app based on different operations of the vehicle. If the head unit determines that the app (executing on the smartphone) is "car safe" or can be controlled based on different operations of the vehicle, the head unit grants access by the app to the data on the vehicle (e.g., begins communicating data to the app on the smartphone). If the head unit determines that the app is not "car safe" or cannot be controlled based on different operations of the vehicle, the head unit rejects communication with the app.

Figure 8:
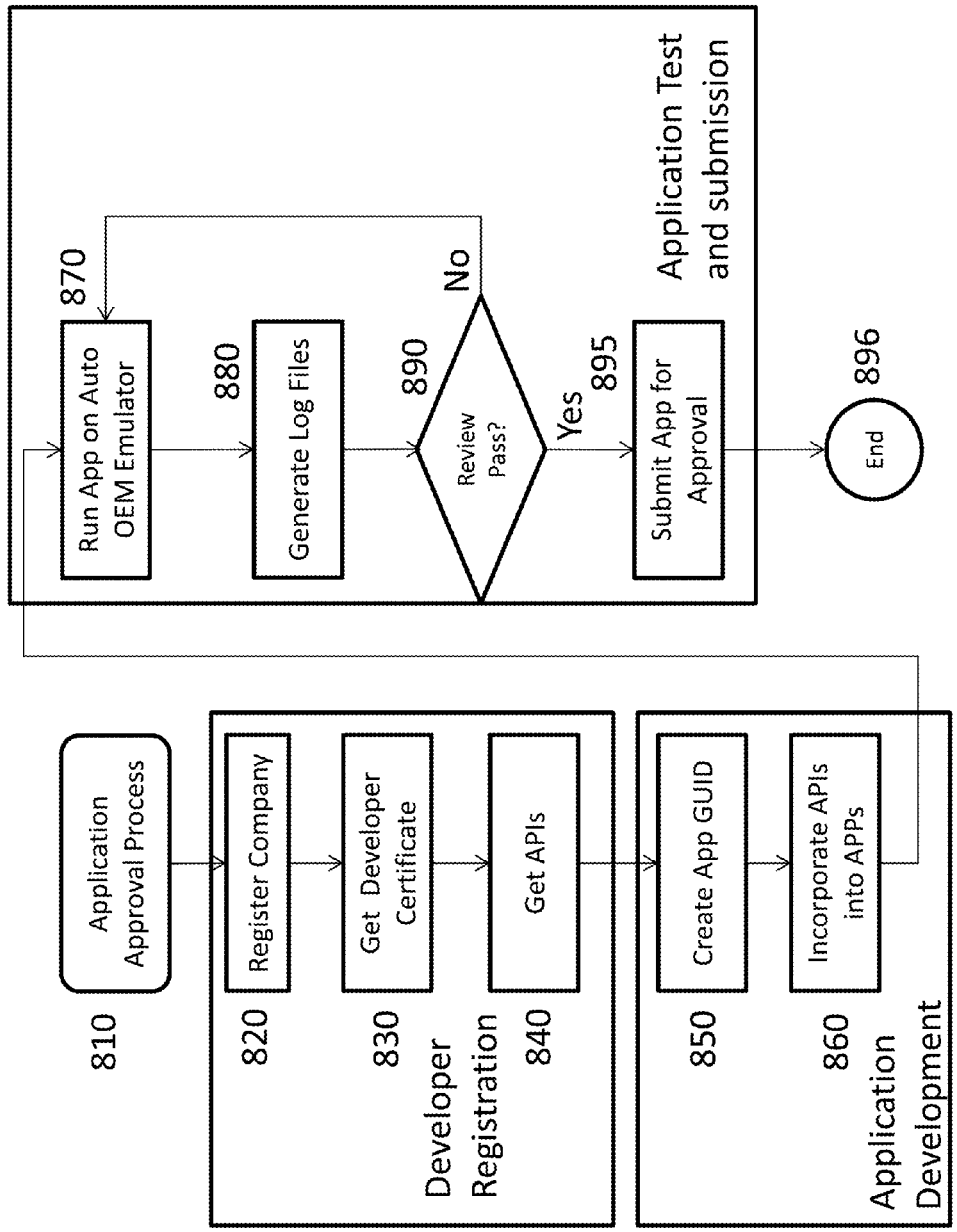
FIG. 8 is a flow diagram of the app approval process on the Internet.

Still another stage in the life cycle of an app is testing. An environment may be configured for automated testing and classification of apps so that third parties may integrate the apps into the automotive app world. FIG. 8 is a flow diagram of the app approval process on the Internet. Application process commences with block 810 in FIG. 8. Blocks 820-840 are part of the registration developer registration block which includes an application developer to register his company, obtain a developer certificate and access the "car safe" APIs for incorporation into the app. The "car safe" APIs are one way in which to enable the control of the app by the head unit (or the smartphone). More specifically, when a vehicle alert is issued, the car safe service controller 350 may issue a command using one or more of the "car safe" APIs in order to control the app as desired.

Blocks 850-860 comprise of the Application Development process wherein the customer creates an identification for this application and incorporates the "car safe" APIs into its app prior to testing. The third set of blocks (870-895) is the Application Test and submission for approval process. After which, at 896, FIG. 8 ends One or more APIs may be used, including for example, API: CS_U_API. CS_U_API details the list of APIs that may be made available in SDK and platform runtime to allow 3rd party developers to develop applications that can be published as certified for "car safe" operation. The methods include:

Handle CS_RegisterApp (AppID): Input: Application Identifier. Output: Returns an handle (hCS) which may be passed to all subsequent calls as a context.

Response CS_Subscribe (hCS, EventEnum): Inputs: (1) Handle to the context; (2) Event that needs to be subscribed for. Output: Response code, which indicates success or error.

Status CS_GetStatus (hCS): Input: Handle to the context. Output: Status of CAR Safe state (e.g., moving or parked).

Error CS_GetError (hCS): Input: Handle to the context. Output: Error code if in error state, else 0.

Response CS_AcknowledgeEvent (hCS, EventEnum): Inputs: (1) Handle to the context; (2) Event which is handled currently. Output: Response code, which indicates success or error.

Response CS_SetParams (hCS, param): Inputs: (1) Handle to the context; (2) Param list of available settings, such as speed threshold, sampling frequency etc. Output: Response code, which indicates success or error.

Response CS_EnquireOtherAppForCSSafe (hCS, AppID): Inputs: (1) Handle to the context; (2) Application Identifier to check if safe to run or not. Output: Response code, which indicates success or error.

Events include the following: (1) Event (Registered); (2) Event (Moving), set the application to distraction safe mode; (3) Event (Parked), set the application to full functional mode; and (4) Event (Error).

The application developer may be provided one or more options of OEM test emulation (e.g., Toyota, Nissan, Mazda) on which the App is tested. Each OEM may require its own testing and install process.

Figure 9:
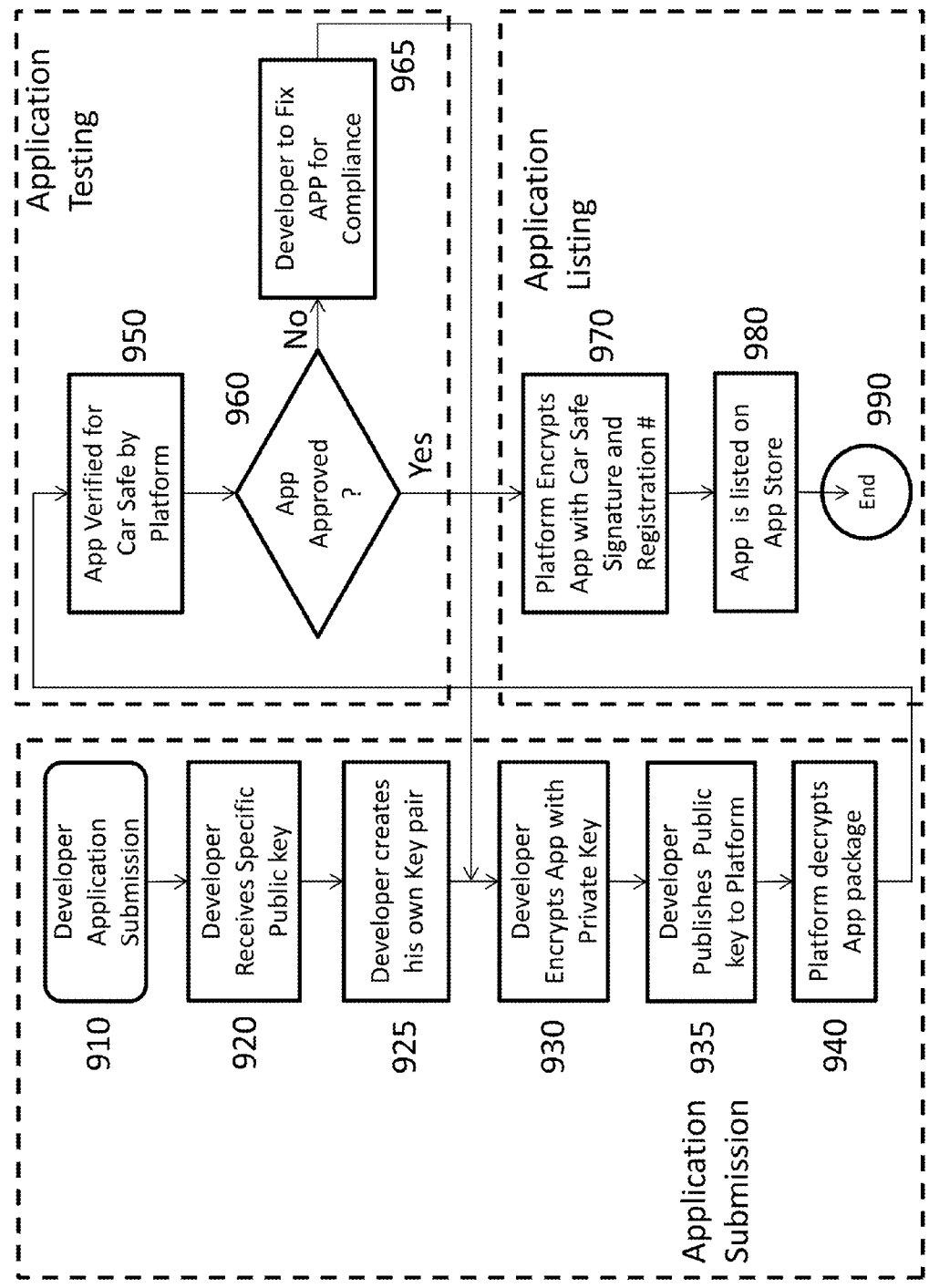
FIG. 9 is a flow diagram of the app submission, approval and listing in the app store.

FIG. 9 is a flow diagram of the app submission, approval and listing in the app store. The Application submission process is illustrated in a series of blocks 910-940, in which the developer may present his application for approval using a secure process. This involves a Platform, such as an Excelfore Platform, generating a public and a private key pair for the developer by the Platform. The developer is then assigned the public key at 920, with the developer then creating his own public and private key pair at 925. The developer encrypts his applications using his Platform public and his private key at 930. The developer then sends the encrypted package application with his public key at 935. At 940, the Platform accepts the package and decrypts it using the developer public key presented and the Platform's own private key.

The application may then enter the testing phase. At 950, the Application Testing phase involves testing by the Platform for "car safe" attributes. At 960, if the application is approved, it is presented for listing in the App Store. Otherwise, at 965, the application is returned to the developer for compliance fixes The application listing process may involve taking the approved developer application, adding a designation (such as a car-safe signature specific to the device or OEM), and encrypt the combination (such as encrypting using a Platform private key specifically generated for the device or OEM at 970). The device has a specific key stored during manufacturing and provisioning of the device. This process may result in the application only being able to be registered on one specific device. The application is then listed in the App Store at 980. The listing process may be either to a consumer marketplace portal or an OEM specific portal. At 990, FIG. 9 ends.

Figure 10:
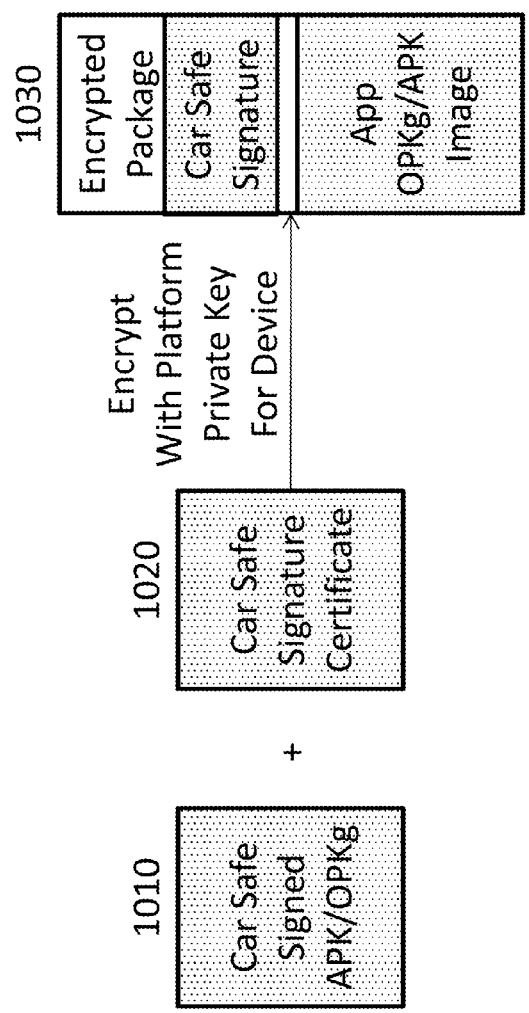
FIG. 10 is a block diagram of the creation of a secure app container for listing in the app store.

FIG. 10 is a block diagram of the creation of a secure app container for listing in the app store. More specifically, the application package process prior to listing is illustrated in FIG. 10. 1010 represents the approved "car safe" application, which is then combined with a "car safe" signature certificate 1020 and encrypted with a private key created for the OEM device 1030.

Figure 11:
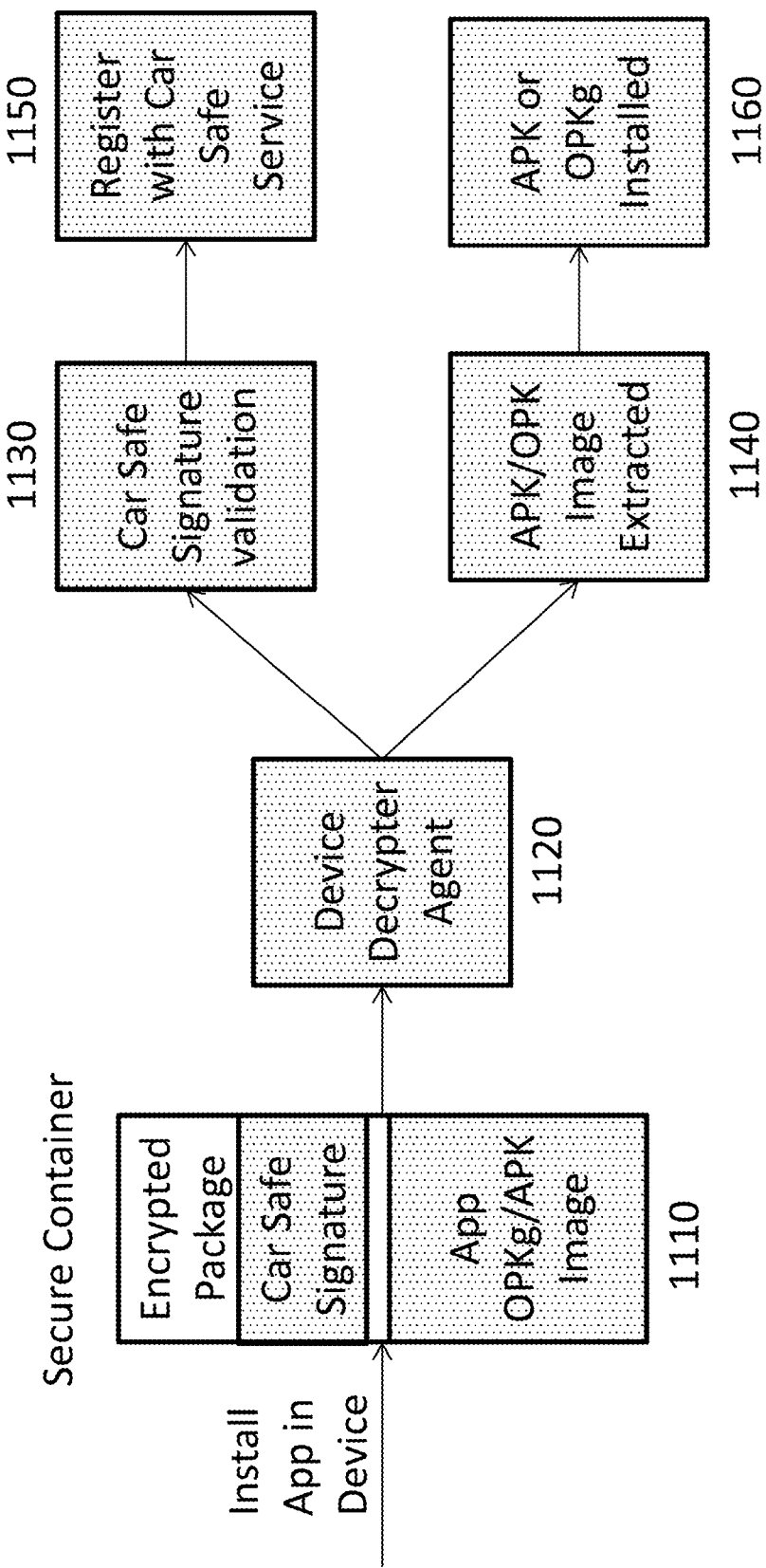
FIG. 11 is a block diagram of the car-safe app installation on the head unit or the smartphone device.

FIG. 11 is a block diagram of the car-safe app installation on the head unit or the smartphone device. In particular, FIG. 11 describes the procedure of a static installation of the app in a head unit device or a smartphone which is paired with the head unit. This installation is termed as static because it is the stage where the application is not executing but has been installed using the Platform sync agent, into the system. The process involves taking the encrypted package 1110, which is decrypted using the device decrypter agent 1120. This results in the two packets, one is the "car safe" signature packet 1130 and the other is the approved application 1140. The "Car Safe" Signature for the application is registered with the Car Safe System 1150 and the application package (e.g., APK for Android or OPKg for HTML5) is installed as any normal application in 1160.

Figure 12:
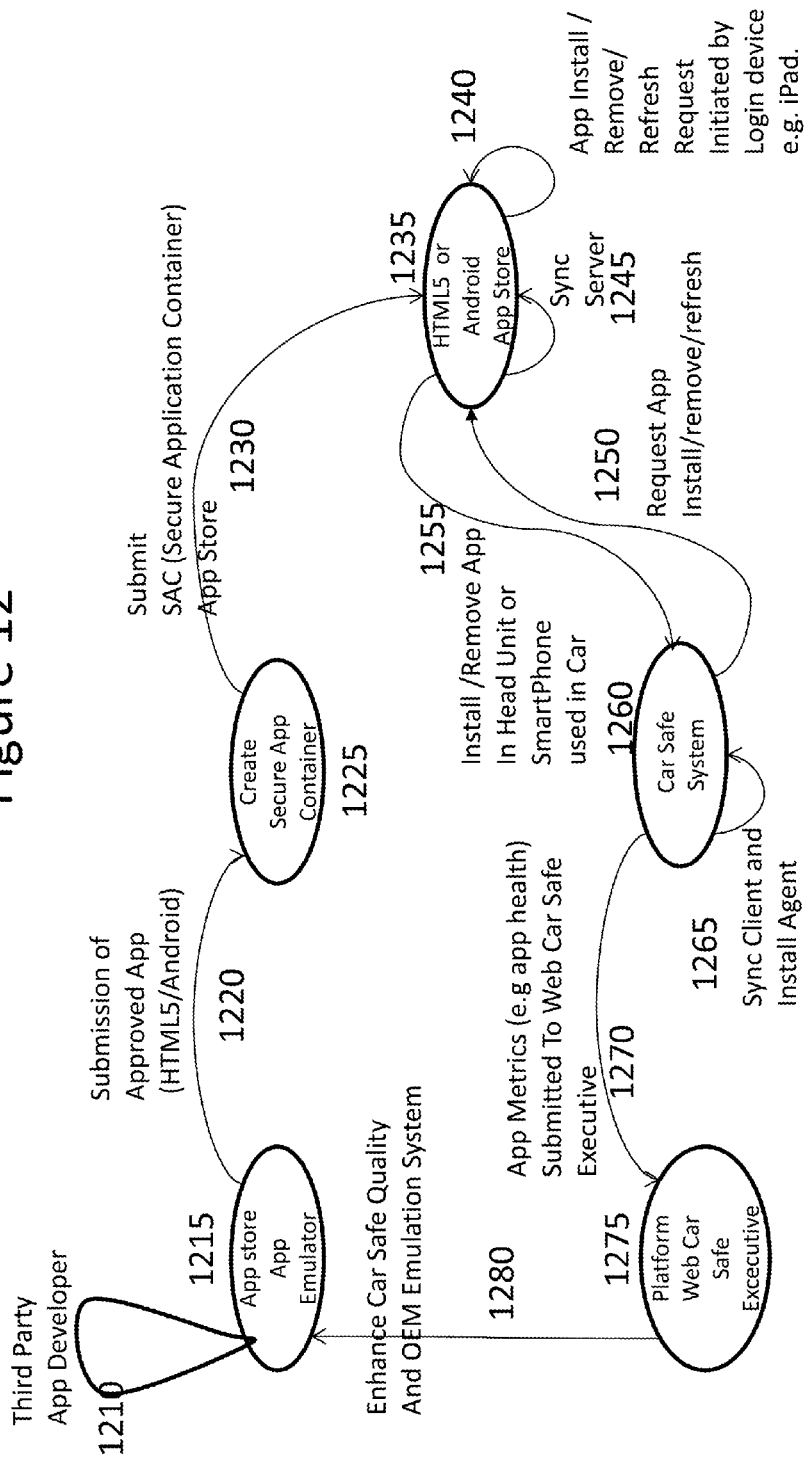
FIG. 12 is a process diagram of the car-safe app install management system.

FIG. 12 is a process diagram of the car-safe app install management system. More specifically, FIG. 12 illustrates a static flow diagram of the process of Applications that are installed and how the Internet supports how they are administered (install, Remove, Refresh, Billing, Provisioning and other functions) from the Internet onto the device. The first block is 1215 which is the Appstore Emulator, that contains emulation environment for each OEMs. The reason for different environments is because head units may carry a different screen resolution and or OS. So app developers 1210, need to work out the proper mechanics of their application on the simulation platform. In this way most of the basic testing of the applications and its behavior are tested before they are submitted for final approval and acceptance.

Applications following testing in the emulation environment are presented for approval in 1220. 1225 proceeds to take the approved app and create a secure container. 1230 presents the secure container for listing into the Appstore 1235.

Appstore also acts as a center for performing application administration into a Head Unit/Smartphone device as directed. While the actions can be initiated by 1240 or 1250, the request action is acknowledged and completed by 1255 in conjunction with the Sync server 1245 in the Appstore 1235 and the 1265 Sync Client in the Device. An application cache in the 1235 maintains a mirror of all installed applications in the device.

Functions performed by 1235+1255 include, but are not limited to: installing applications into a device; removing applications from a device; automatically refreshing an application if flagged and also when OEM requests an OS refresh into the device; billing in which some applications may have a cost associated with them and if purchased, then the user is billed for the application through the Appstore.

Commands for install/remove applications may be initiated through a browser interface from either the Device or an external device e.g., an iPad® that logs into the Appstore and initiates action on the device subscribed.

Once the apps are downloaded into the Car Safe System, they may be registered. This is discussed above in FIG. 11.

At predetermined intervals, app activity metrics (e.g. app health, memory leaks, usage, interaction with other apps) discussed above may be loaded by 1270 into the "Car Safe Executive" running in the Appstore 1275. The inputs from the metrics are then provided by 580 to enhance the OEM emulation environment.

Figure 13:
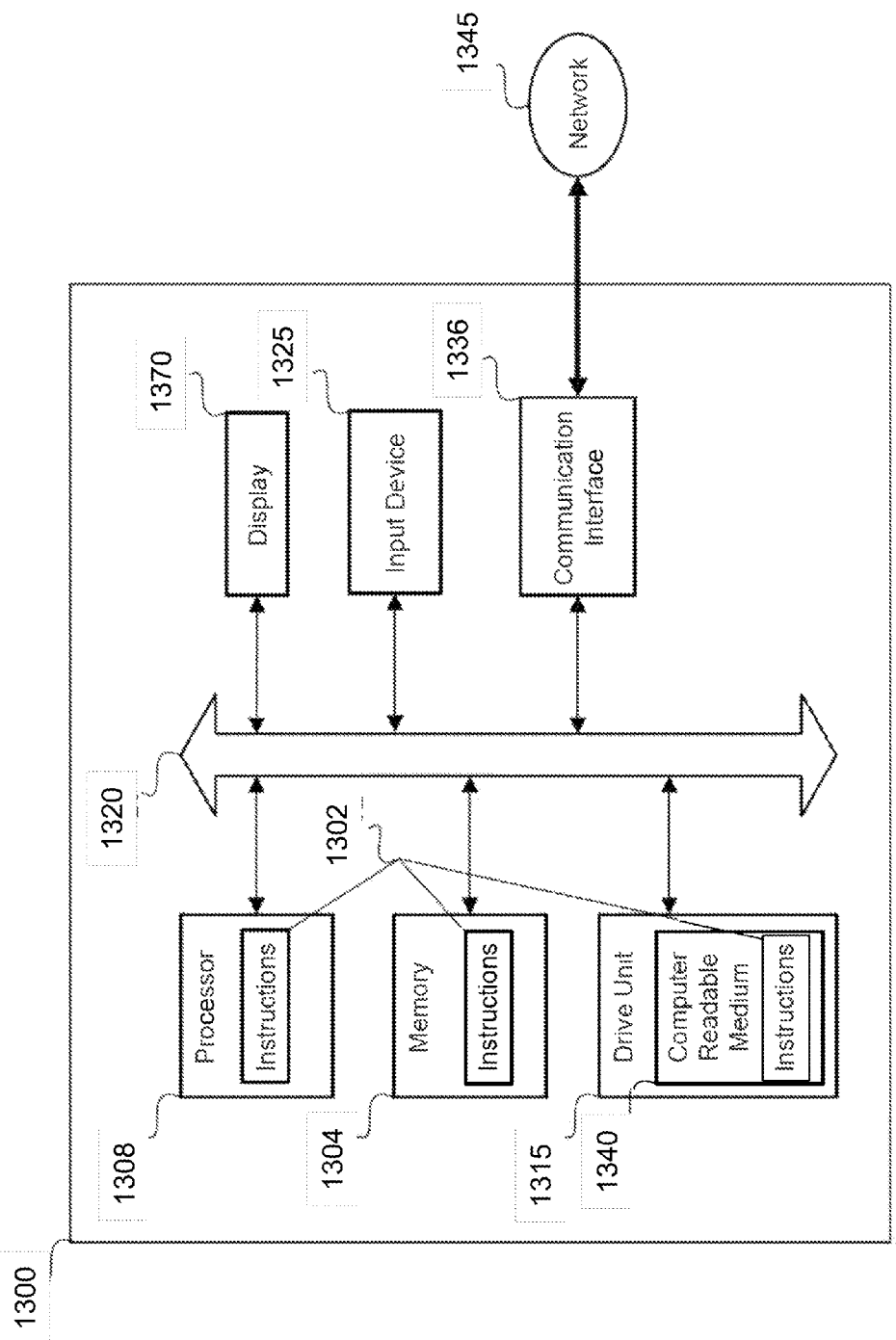
FIG. 13 is a general computer system, programmable to be a specific computer system, which may represent any of the computing devices referenced herein, such as the head unit or the smartphone.

FIG. 13 illustrates a general computer system 1300, programmable to be a specific computer system 1300, which can represent any server, electronic device or electronic component, such as the head unit client 700 or smartphone client 700, app store server 750, electronic device 780, administrative electronic device 785, head unit depicted in FIGS. 1A-C, and smartphone depicted in FIGS. 2A-B. The computer system 1300 may include an ordered listing of a set of instructions 1302 that may be executed to cause the computer system 1300 to perform any one or more of the methods or computer-based functions disclosed herein. The computer system 1300 can operate as a stand-alone device or can be connected, e.g., using the network 1345, to other computer systems or peripheral devices.

In a networked deployment, the computer system 1300 can operate in the capacity of a server or as a client-user computer in a server-client user network environment, or as a peer computer system in a peer-to-peer (or distributed) network environment. The computer system 1300 can also be implemented as or incorporated into various devices, such as a personal computer or a mobile computing device capable of executing a set of instructions 1302 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 1300 can include a memory 1304 on a bus 1320 for communicating information. Code operable to cause the computer system to perform any of the acts or operations described herein can be stored in the memory 1304. The memory 1304 can be a random-access memory, read-only memory, programmable memory, hard disk drive or any other type of volatile or non-volatile memory or storage device.

The computer system 1300 can include a processor 1308, such as a central processing unit (CPU) and/or a graphics processing unit (GPU). The processor 1308 can include one or more general processors, digital signal processors, application specific integrated circuits, field programmable gate arrays, digital circuits, optical circuits, analog circuits, combinations thereof, or other now known or later-developed devices for analyzing and processing data. The processor 1308 can implement the set of instructions 1302 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 1300 can also include a disk or optical drive unit 1315. The disk drive unit 1315 can include a computer-readable medium 1340 in which one or more sets of instructions 1302, e.g., software, can be embedded. Further, the instructions 1302 can perform one or more of the operations as described herein. The instructions 1302 can reside completely, or at least partially, within the memory 1304 or within the processor 1308 during execution by the computer system 1300. Accordingly, the databases 206 or 260 can be stored in the memory 1304 or the disk unit 1315.

The memory 1304 and the processor 1308 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 1300 can include an input device 1325, such as a keyboard or mouse, configured for a user to interact with any of the components of system 1300. It can further include a display 1370, such as a liquid crystal display (LCD), a cathode ray tube (CRT), or any other display suitable for conveying information. The display 1370 can act as an interface for the user to see the functioning of the processor 1308, or specifically as an interface with the software stored in the memory 1304 or the drive unit 1315.

The computer system 1300 can include a communication interface 1336 that enables communications via the communications network 1345. The network 1345 can include wired networks, wireless networks, or combinations thereof. The communication interface 1336 network can enable communications via any number of communication standards, such as 802.11, 802.17, 802.20, WiMax, 802.15.4, cellular telephone standards, or other communication standards, as discussed above. Simply because one of these standards is listed does not mean any one is preferred, as any number of these standards can never actually be adopted in a commercial product.

Block diagrams of different aspects of the system, including FIGS. 1A-C, 2A-B, 3 and 7 may be implemented using the computer functionality disclosed in FIG. 13. Further, the flow diagrams illustrated in FIGS. 4-6 and 8-11 may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A controller of a head unit in a vehicle, the controller configured to:
   receive information regarding a current operation or a current environment of the vehicle;
   determine whether or how to control operation of an app based on the current operation or the current environment of the vehicle, wherein the controller is configured to determine whether or how to control operation of the app by determining a type of app, wherein the type of app comprises whether the app is controllable by the controller in order to reduce distraction to a driver of the vehicle; and
   control execution of the app by:
      in response to determining that the app is controllable by the controller in order to reduce distraction to the driver of the vehicle, maintain execution of the app but modify at least one aspect of the execution of the app; and
      in response to determining that the app is not controllable by the controller in order to reduce distraction to the driver of the vehicle, halt execution of the app or change display of the app to a background of a display,
   wherein the app comprises a software application downloaded from a server to the head unit.

2. The controller of claim 1, wherein the controller is configured to determine whether or how to control operation of the app by determining whether the app is controllable by the controller in order to reduce distraction to a driver of the vehicle and by determining a type of output of the app.

3. The controller of claim 2, wherein a type of output of the app comprises video;
   wherein in response to determining that the app is controllable by the controller in order to reduce distraction to the driver of the vehicle and in response to determining that the type of output of the app comprises video, the controller is configured to discontinue updating images output to a display and to maintain output of audio; and
   wherein in response to determining that the app is not controllable by the controller in order to reduce distraction to the driver of the vehicle and in response to determining that the type of output of the app comprises video, the controller is configured to pause the video.

4. The controller of claim 2, wherein a type of output of the app comprises audio;
   wherein the app comprises an Internet radio app;
   wherein in response to determining that the app is controllable by the controller in order to reduce distraction to the driver of the vehicle and in response to determining that the type of output of the app comprises audio, the controller is configured to provide limited control of the Internet radio app and to maintain output of audio; and
   wherein in response to determining that the app is not controllable by the controller in order to reduce distraction to the driver of the vehicle and in response to determining that the type of output of the app comprises audio, the controller is configured to exclude control of the Internet radio app and to maintain output of audio.

5. The controller of claim 1, wherein the controller is configured to determine whether or how to control operation of the app by determining whether the app is controllable by the controller in order to reduce distraction to a driver of the vehicle and by determining a type of input to the app.

6. The controller of claim 5, wherein a type of input to the app comprises text;
   wherein in response to determining that the app is controllable by the controller in order to reduce distraction to the driver of the vehicle and in response to determining that the type of input to the app comprises text, the controller is configured to disable manual text entry; and
   wherein in response to determining that the app is not controllable by the controller in order to reduce distraction to the driver of the vehicle and in response to determining that the type of input to the app comprises text, the controller is configured to disable all text entry.

7. The controller of claim 1, wherein the information regarding the current environment comprises alert information received from Advanced Driver Assistance System (ADAS); and
   wherein the controller is configured to determine whether or how to control operation of an app by:
      altering one or more metrics for the controller to control the app in response to the alert information received from the ADAS;
      comparing the information regarding the current operation of the vehicle to the altered one or more metrics;
      modify operation of the app based on comparing the information regarding the current operation of the vehicle to the altered one or more metrics; and
      highlighting a condition of the vehicle on a road.

8. The controller of claim 1, wherein the controller is configured to determine whether or how to control operation of the app by determining an output device for use with the app.

9. The controller of claim 8, wherein the controller is configured to determine whether or how to control operation of the app by determining whether the output device is designated as a passenger display for display to a passenger of the vehicle or as a driver display for display to a driver of the vehicle.

10. The controller of claim 9, wherein the controller is configured to determine to control operation of the app in response to determining that the output device for use with the app is a driver display.

11. The controller of claim 1, wherein the controller is configured to determine whether or how to control operation of the app by determining a type of alert.

12. The controller of claim 11, wherein the type of alert comprises an alert indicative of a predetermined speed of the vehicle.

13. The controller of claim 11, wherein the type of alert comprises an alert indicative of a catastrophic event for the vehicle.

14. The controller of claim 1, wherein the controller is configured to determine whether or how to control operation of an app dynamically.

15. The controller of claim 14, wherein the controller is configured to determine whether or how to control the operation of the app based on one or more parameters; and
wherein the one or more parameters are updated dynamically.

16. A controller of a head unit of a vehicle, the controller configured to:
receive information regarding a current operation or a current environment of the vehicle;
determine whether or how to control operation of an app based on the current operation or the current environment of the vehicle, wherein the controller is configured to determine whether or how to control operation of the app by determining a type of app, wherein the type of app comprises whether the app is controllable by the controller in order to reduce distraction to a driver of the vehicle; and
execute the app,
wherein the app comprises a software application downloaded from a server to the head unit, and
wherein the information regarding the current environment is received from an information service external to the vehicle and configured to indicate a specific road alert; and
wherein the controller is configured to determine whether or how to control operation of an app by:
altering one or more metrics for the controller to control the app in response to the indicated specific road alert;
comparing the information regarding the current operation of the vehicle to the altered one or more metrics;
modify operation of the app based on comparing the information regarding the current operation of the vehicle to the altered one or more metrics; and
highlighting an emergency condition on the road.

17. A controller of a head unit of a vehicle, the controller configured to:
receive information regarding a current operation or a current environment of the vehicle;
determine whether or how to control operation of an app based on the current operation or the current environment of the vehicle, wherein the controller is configured to determine whether or how to control operation of the app by determining a type of app, wherein the type of app comprises whether the app is controllable by the controller in order to reduce distraction to a driver of the vehicle; and
execute the app,
wherein the app comprises a software application downloaded from a server to the head unit,
wherein alert information regarding the current operation is received from a CAN bus; and
wherein the controller is configured to determine whether or how to control operation of an app by:
altering one or more metrics for the controller to control the app in response to the alert information received from the CAN bus;
comparing the information regarding the current operation of the vehicle to the altered one or more metrics; and
modify operation of the app based on comparing the information regarding the current operation of the vehicle to the altered one or more metrics.

18. A controller of a head unit of a vehicle, the controller configured to:
receive information regarding a current operation or a current environment of the vehicle; and
dynamically determine whether or how to control operation of an app based on the current operation or the current environment of the vehicle and based on one or more parameters,
wherein the app comprises a software application downloaded from a server to the head unit,
wherein the one or more parameters are updated dynamically, and
wherein the controller is configured to receive one or more updated parameters, the one or more updated parameters being based on monitoring of operations of apps in the controller, the monitoring of the operations of the apps being performed external to the head unit.

19. A controller of a head unit in a vehicle, the head unit in communication with a portable electronic device, the controller configured to:
receive information regarding a current operation or a current environment of the vehicle;
generate an alert, the alert indicative of the current operation or the current environment of the vehicle; and
send the alert to the portable electronic device, the alert used by the portable electronic device to determine whether or how to control operation of an app executed by the portable electronic device,
wherein the app comprises a software application downloaded from a server to the portable electronic device,
wherein the portable electronic device comprises a smartphone in communication with the head unit of the vehicle,
wherein a type of app comprises whether the app is controllable by the controller in order to reduce distraction to a driver of the vehicle; and
wherein the controller is further configured to determine whether to communicate with the app depending on whether the app is controllable by the controller in order to reduce distraction to the driver of the vehicle.

20. The controller of claim 19, wherein the controller is configured to determine not to communicate with the app if it is determined that the app is not controller by the controller to reduce distraction to the driver of the vehicle.

21. A smartphone comprising:
a transceiver;
a memory configured to store an app;
a processor in communication with the transceiver and the memory, the processor, in executing the app, being configured to:
request, via the transceiver, communication with a head unit of a vehicle;
receive, via the transceiver, an alert, the alert indicative of a current operation or a current environment of the vehicle; and
analyze the alert to determine whether or how to control operation of the app,
wherein the app comprises a software application downloaded from a server to the smartphone, and
wherein the processor, in executing the app, is configured to request communication with the head unit by sending information as to a type of app, the type of app comprises whether the app is controllable by the head unit in order to reduce distraction to a driver of the vehicle.

22. A smartphone comprising:
a transceiver;
a memory configured to store an app;
a processor in communication with the transceiver and the memory, the processor, in executing the app, being configured to:

request, via the transceiver, communication with a head unit of a vehicle;

receive, via the transceiver, an alert, the alert indicative of a current operation or a current environment of the vehicle; and analyze the alert to determine whether or how to control operation of the app, wherein the app comprises a software application downloaded from a server to the smartphone, and wherein the processor, in executing the app, is configured to analyze the alert to determine whether or how to control operation of the app by:

determining whether the alert indicates a speed of the vehicle; and modifying operation of the app based on the speed of the vehicle.

* * * * *